Figure 1:
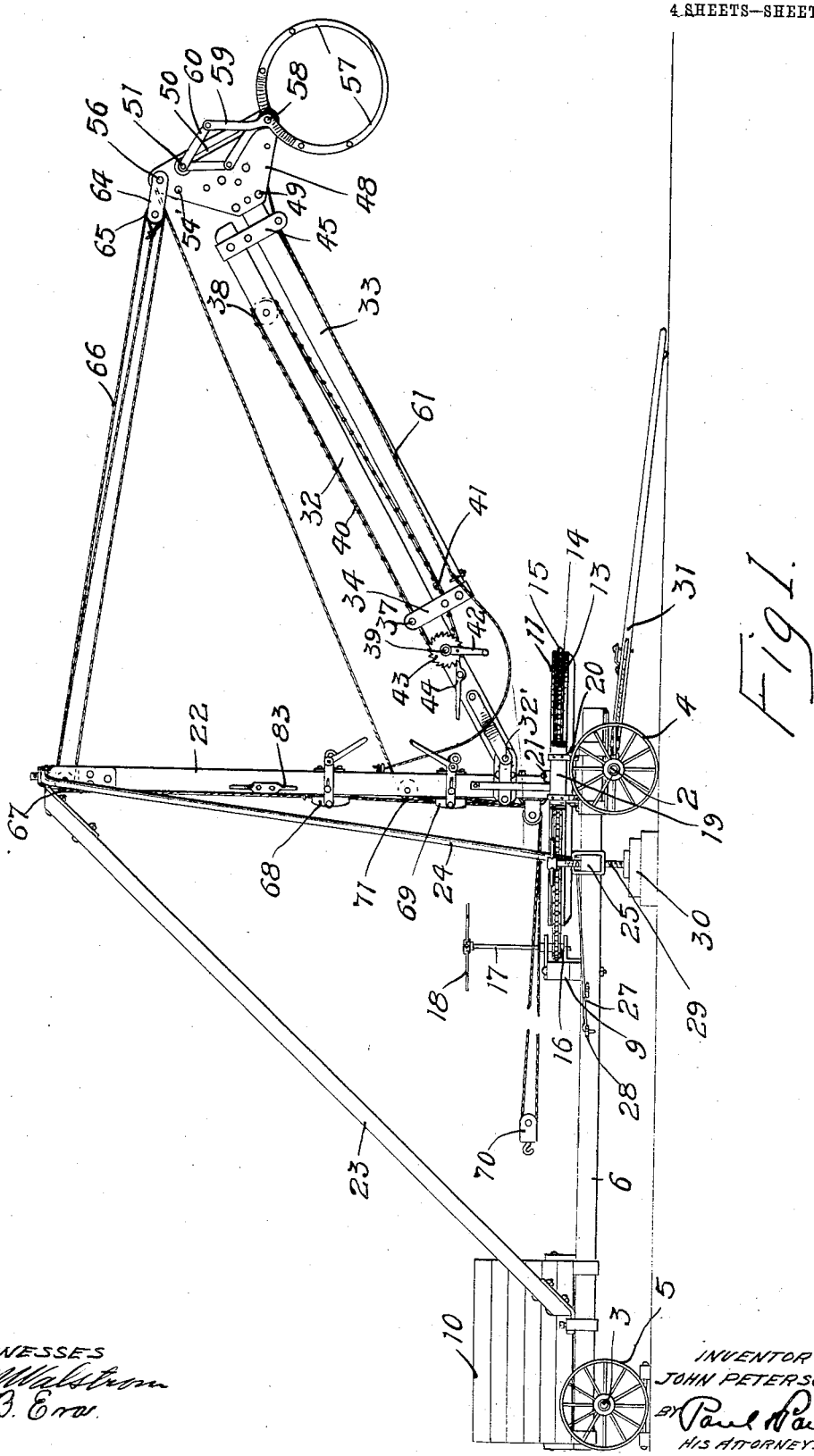

J. PETERSON.
HAY AND MANURE GATHERER AND LOADER.
APPLICATION FILED APR. 22, 1907.

912,611.

Patented Feb. 16, 1909.
4 SHEETS—SHEET 1.

WITNESSES

INVENTOR
JOHN PETERSON
BY Paul Paul
HIS ATTORNEYS

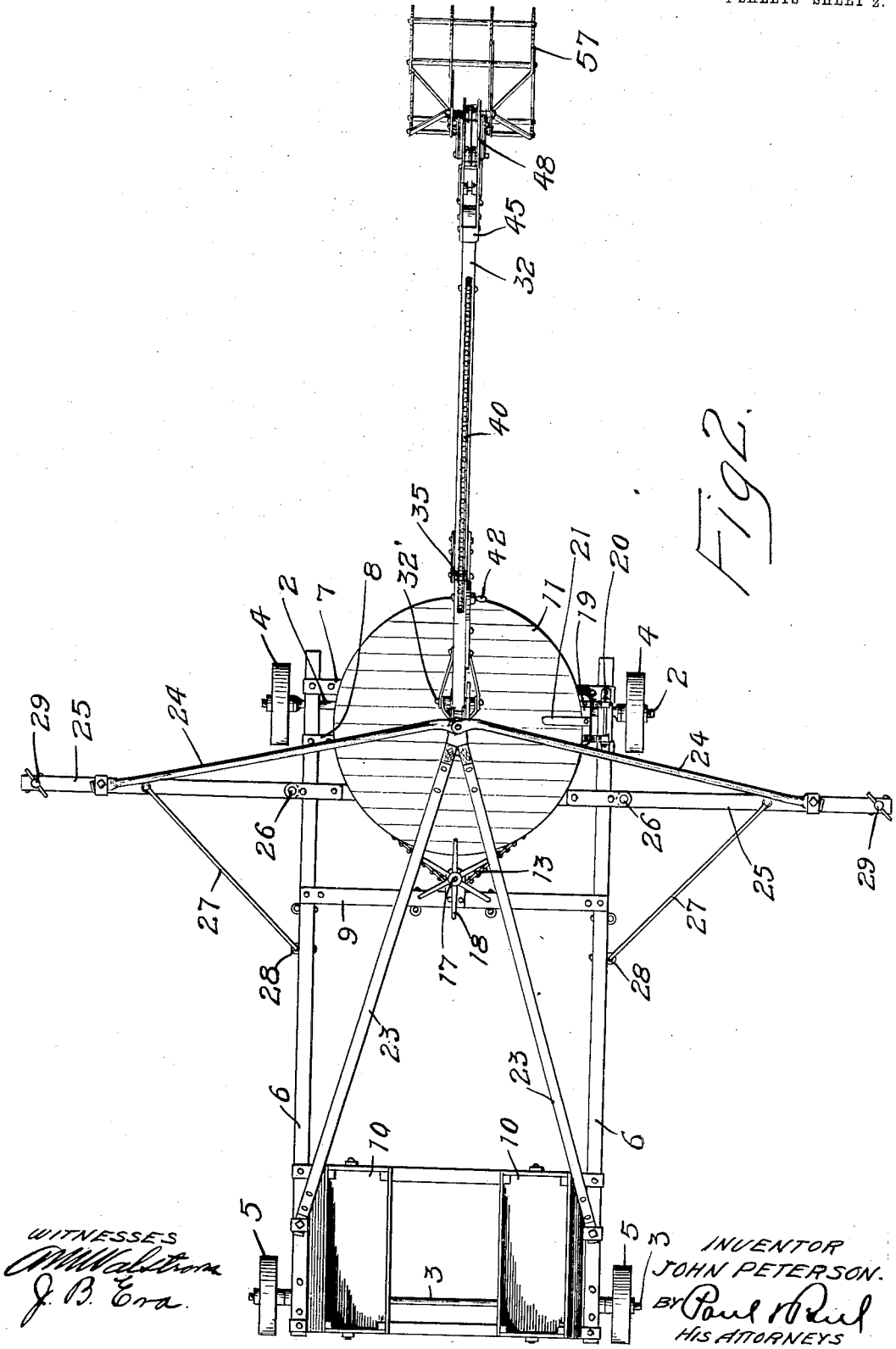

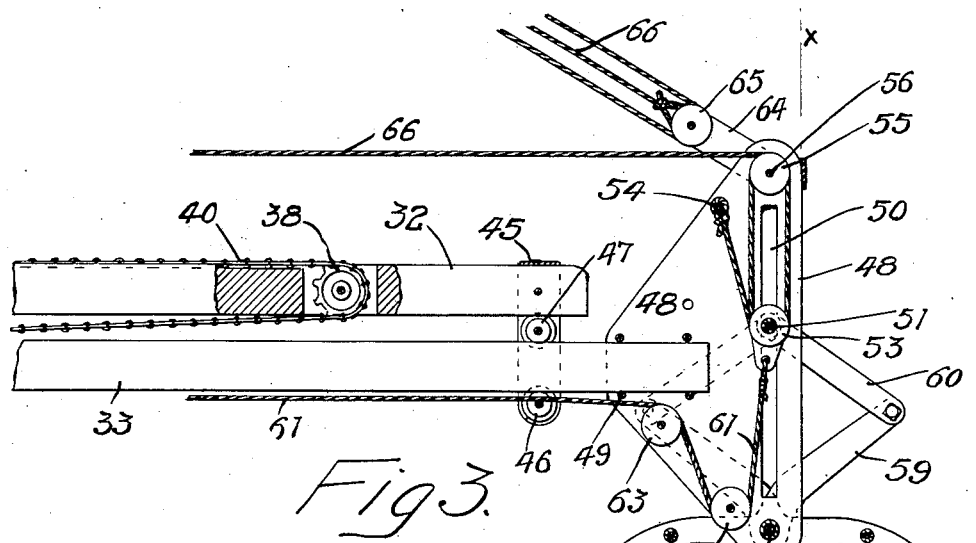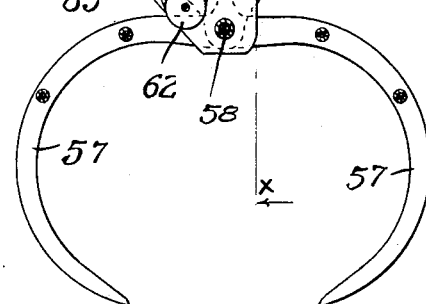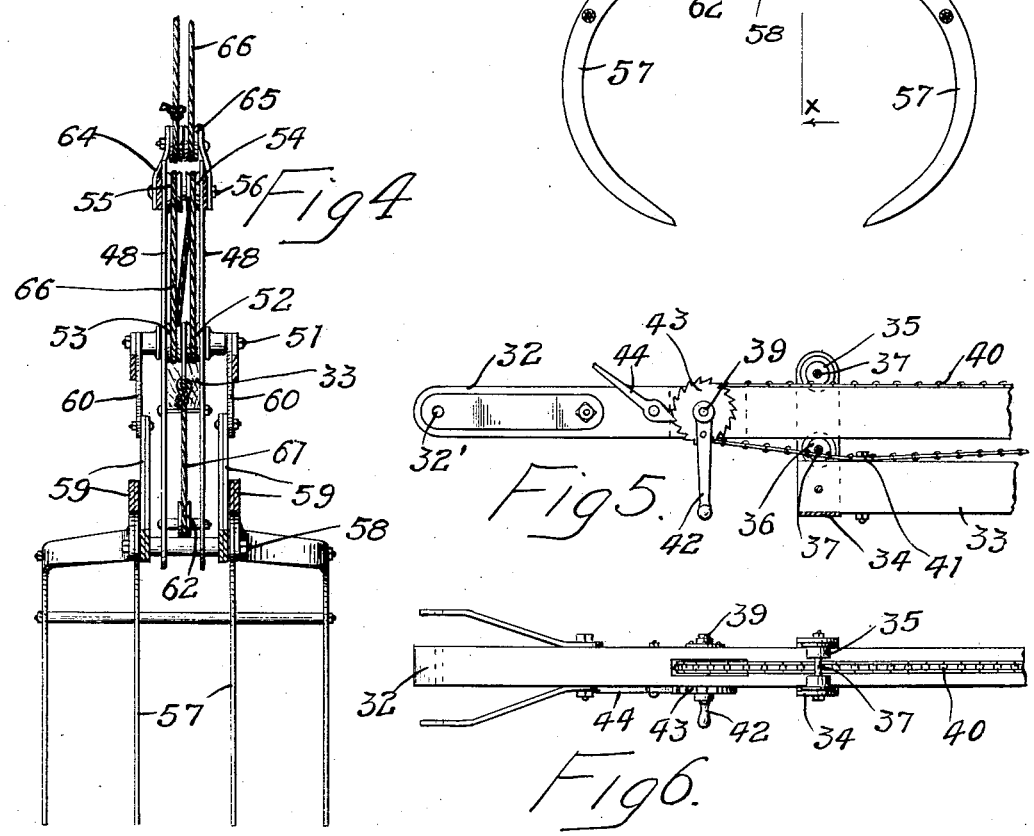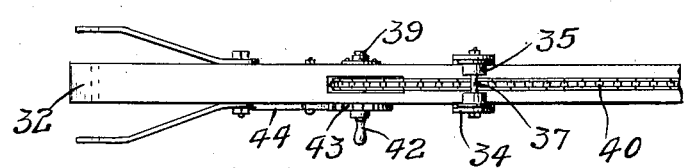

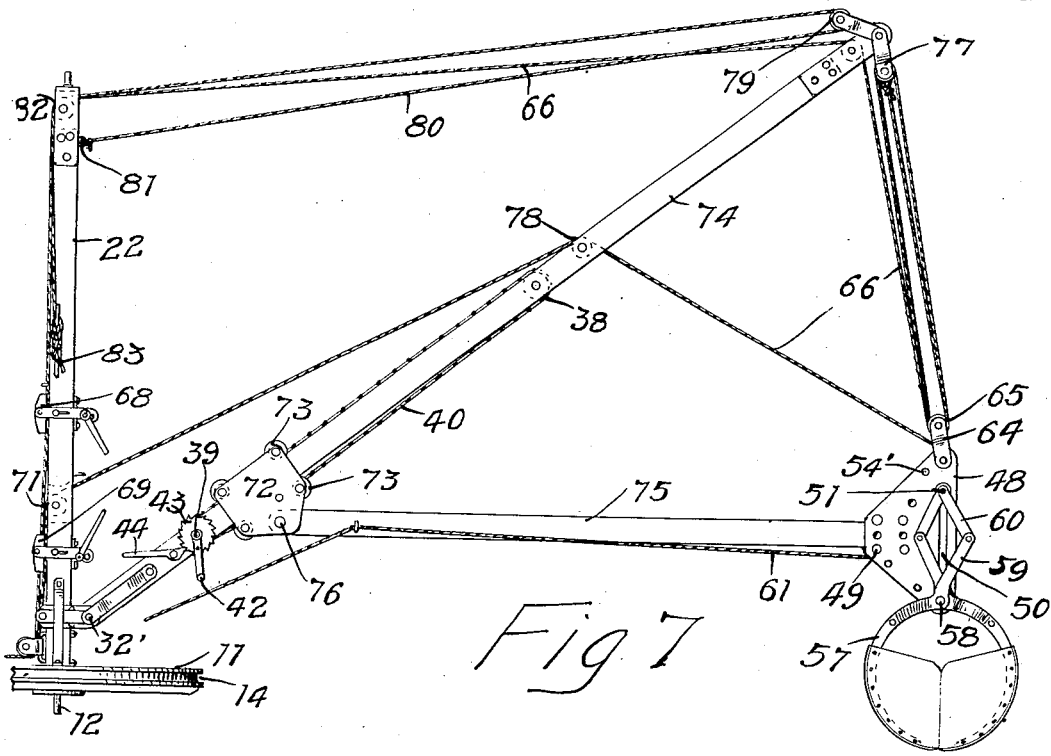
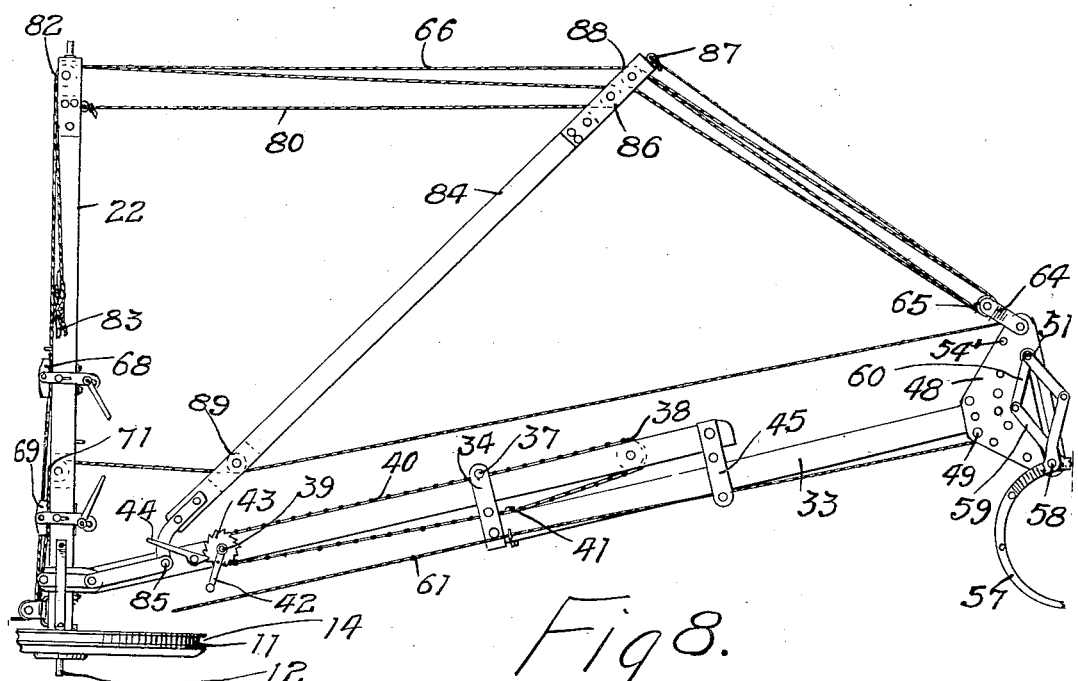

UNITED STATES PATENT OFFICE.

JOHN PETERSON, OF ST. PAUL, MINNESOTA.

HAY AND MANURE GATHERER AND LOADER.

No. 912,611.  Specification of Letters Patent.  Patented Feb. 16, 1909.

Application filed April 22, 1907. Serial No. 369,481.

*To all whom it may concern:*

Be it known that I, JOHN PETERSON, of St. Paul, Ramsey county, Minnesota, have invented certain new and useful Improvements in Hay and Manure Gatherers and Loaders, of which the following is a specification.

My invention relates to farm implements and particularly to the type shown and described in a certain pending application for Letters Patent of the United States filed by me February 26, 1906, No. 303,116.

The object of my present invention is to simplify and improve the mechanism for moving the fork carrier back and forth on the boom.

A further object is to provide means for bracing the frame supporting the boom to prevent its tilting when the gatherer is loaded and the boom extended.

A further object is to provide improved means for revolving the mast whereon the boom is mounted, and, a still further object is to provide means in connection with the boom to adapt the gathering fork for work in excavations or places below the level of the pivot of the boom on the mast.

The invention consists generally in various constructions and combinations, all as hereinafter described and particularly pointed out in the claims.

In the accompanying drawings, forming part of this specification, Figure 1 is a side elevation of a hay and manure gatherer embodying my invention. Fig. 2 is a plan view of the same. Fig. 3 is a detail view illustrating the manner of mounting the gathering fork on the end of the boom. Fig. 4 is a sectional view on the line x—x of Fig. 3. Figs. 5 and 6 are detail views of the mechanism for moving the boom extension back and forth on the boom. Fig. 7 is a side elevation illustrating an attachment for the boom to adapt the gathering device for work below the level of the pivot of the boom. Fig. 8 is a similar view illustrating a device for bracing or supporting the boom when the gathering fork is at work below the level of the boom pivot.

In the drawing, 2 and 3 represent the forward and rear axles having carrying wheels 4 and 5 and side timbers 6 connecting the axles. Cross bars 7, 8 and 9 are also provided between the said timbers 6. Boxes 10 suitably weighted are mounted on the rear ends of the timbers 6 and hold the frame in place to balance the mast and the loaded boom at the forward end of the frame.

11 is a circular turn table having a central pivot 12 on its under side on the forward portion of the frame and arranged to be revolved by means of a chain 13 that fits within a peripheral groove 14 in the turn table and is secured at 15 thereto and passes around a sprocket wheel 16 on an upright shaft 17 having a hand wheel 18. By turning the shaft 17 the turn table may be revolved in either direction to bring the boom and the gathering fork in working position on either side of the forward portion of the machine or in front of the same. A brake block 19 is pivoted at 20 on the machine frame and adapted to engage the periphery of the turn table, and is provided with a handle 21 by means of which the block may be moved into engagement with the turn table or swung outwardly away from it.

22 is a mast centrally mounted on the turn table and having braces 23 connecting its upper ends with the rear portions of the timbers 6. Braces 24 are also provided having their upper ends attached to the upper end of the mast and their lower ends pivotally connected to bars 25 that are pivoted at 26 to the side timbers 6 and are adapted to swing in parallel with the said side timbers or outwardly to a position substantially at right angles thereto, as indicated in Fig. 2. Rods 27 are pivotally mounted on the bars 25 and have hooked inner ends to enter eyes 28 provided on the side timbers, and thereby lock the bars in their outward position. Screw rods 29 are also mounted in the bars 25 and adapted to bear upon blocks 30 that are placed under the bars on each side of the machine. By turning the screw rods up and down the bars may be leveled until the strain is equally distributed on the frame and the gathering fork can be moved to the outer ends of the boom without danger of tilting.

A draft device 31 is provided at the forward end of the frame for convenience in moving the apparatus from place to place.

32 is a boom pivoted at 32' on the mast and capable of swinging thereon in a vertical plane or horizontally therewith from side to side of the machine. An extension 33 of the boom is provided under the main boom 32 and has plates 34 at its inner end extending up on each side of the boom 32 and having bearings for wheels 35 and 36 that are mounted on shafts 37 in said plates above and below the boom 32. A sprocket wheel 38 is mounted in the outer end of the boom 32 and a similar sprocket wheel is mounted on a shaft 39 near the inner end of the boom, and a chain 40 passes around the said sprockets through slots in the boom in which the wheels operate. The upper and lower sections of the chain travel along the upper and lower edges respectively of the boom, as indicated in Fig. 1, and the chain is attached at 41 to the boom extension 33. A crank 42 is provided on the shaft 39 having a ratchet 43 and a dog 44. By operating the crank the chain may be moved back and forth on the boom and the extension 33 moved out to lengthen the boom, or drawn in to shorten it. Plates 45 are provided on the outer end of the boom, and anti-friction wheels 46 and 47 are mounted in said plates between which wheels the boom extension is adapted to slide (see Fig. 3). Upon the other end of the boom extension 33 is a frame consisting of side plates 48 supported on said boom extension by bolts 49 which pass through said plates and above and below the boom. Vertical slots 50 are provided in said plates and a shaft 51 is slidable in said slots and is provided with pulleys 52 and 53. Similar pulleys 54 and 55 are mounted on a shaft 56 in the upper end of the plates 48.

A gathering fork having a series of curved tines 57 is pivoted at 58 in the lower portion of the plates 48 and arms 59 are formed on the said tines near their pivots and extend upwardly therefrom and are pivotally connected with the ends of the shaft 51 by links 60. A cable 61 is attached to the shaft 51 and extends down under a sheave 62 and over a sheave 63, and from thence to the inner end of the boom extension and the mast, within convenient reach of the operator to enable him to draw down the shaft 51 and open the jaws of the fork. Plates 64 are pivoted in the upper ends of the plates 48 and carry sheaves 65. A cable 66 is attached to the plates 64 and extends to the top of the mast over a pulley 67 thereon and from thence back to the sheave 65 and to the top of the mast and then down beside the mast between it and the brake shoe 68 corresponding to the one described in my pending application above referred to, and from thence to a block 70 to which the power is attached. After leaving the block 70 the cable passes back to the mast and between it and a second brake shoe 69 and over a sheave 71 to the sheave 55 and from thence around the sheaves 52 and 53 to a rod 54' between the plates where the cable is secured. With this arrangement of the cable, which is substantially the same as described in my former application, the operator by means of the brakes 68 and 69 can apply the power to lift the boom with its load or to allow the boom to remain stationary and raise the shaft 51 to close the fork and gather up its load. When the fork has been loaded power is applied to the cable section connected therewith to close the fork and hold it in a closed position and the boom may then be raised and swung with the loaded fork to the place where the load is dumped.

It is sometimes desirable to use the gathering apparatus in an excavation or point below the level of the boom pivot, and to adapt the apparatus for this purpose, I provide a carriage 72 having wheels 73 to slide on the boom 74 which is longer than the boom 32 illustrated in Fig. 1, and is mounted on the mast in place thereof. The carriage 73 is moved back and forth on the boom by means of the chain device illustrated and already described with reference to the construction in Fig. 1, and I will use the same reference numerals to designate the different parts. 75 is a supplementary boom pivoted at 76 on the carriage 72 and adapted to support at its outer end the gathering fork mechanism that is shown in Fig. 1 as mounted on the end of the boom extension 33. The cable for raising the supplementary boom 75 and operating the gathering device is arranged in substantially the same way as shown in Fig. 1, except that one end is attached at 77 to the under side of the boom 74 and has the effect of raising the supplementary boom 75 instead of lifting both booms as in Fig. 1. The other end of the cable is carried over a sheave 78 on the boom 74 and from thence to the gathering fork mechanism to close the same. The main boom 74 has a sheave 79 on its outer end around which a cable 80 passes that is attached at 81 to the top of the mast and from thence passes out around the sheave 79 to a sheave 82 at the top of the mast and to a fastening cleat 83 on the side of the mast. By means of this cable the operator can raise or lower the boom 74 according to the depth of the excavation in which the gathering fork is working.

It may sometimes happen in an apparatus of this kind that the angle of the boom may be such that the weight of the load will cause too great a strain on the pivot or leverage on the base of the mast. I therefore, as shown in Fig. 8, provide a brace boom 84 pivoted at 85 on the boom 32 and having a sheave 86 at its outer end around which the cable 80 passes and is attached to the mast in the manner shown in Fig. 8. The operating cable is attached at 87 to the end of the brace boom 84 and from thence passes down around the sheave 65 and from thence to a sheave 88 on the brace boom and to the mast in the manner heretofore described. A sheave 89 is provided on the brace boom near its inner end in position to be engaged by the other portion of the operating cable which runs to and closes the gathering fork mechanism.

This apparatus can be transported from place to place on the carrying wheels and when set up with the brace bars in position will be extremely stable and rigid and the frame will not tilt under the weight of the boom and the loaded fork. It is adapted for all kinds of work, a scoop being used in place of the fork whenever desired, as indicated in Fig. 7 when the apparatus is used for handling fine material and the gathering device can be adapted to work in the bottom of an excavation below the level of the boom without danger to the pivot of the boom or the mast.

The truck frame illustrated herein is adapted for a great variety of farm work as the turn table and boom can be easily and quickly removed whenever the apparatus is not in use as a derrick or for manure or hay gathering purposes.

I claim as my invention:

1. The combination, with a frame having carrying wheels, of a mast mounted thereon, a boom pivoted on said mast, a gathering fork having an operating cable, bars pivoted on each side of said frame and adapted to be swung outwardly at right angles substantially thereto, or moved inwardly to a position parallel with said frame, rods connecting said bars with the top of said mast, and braces provided between said bars and frame and bearings provided at the outer ends of said bars, substantially as described.

2. The combination, with a frame having carrying wheels, of a mast, a boom pivoted thereon, a gathering fork, an operating cable therefor, bars pivoted on each side of said frame and adapted to be swung outwardly at right angles substantially thereto, rods connecting said bars with the top of said mast and bearings provided on said bars near their outer ends, substantially as described.

3. The combination, with a frame having carrying wheels, of a turn table supported thereon, a mast mounted on said table, a boom pivoted on said mast, an operating cable for said boom, a chain having its ends attached to the periphery of said turn table, an upright shaft located in the middle of said frame near said turn table and having a sprocket around which said chain passes, and means for revolving said shaft to rotate said turn table, substantially as described.

4. The combination, with a frame, of a turn table mounted thereon, means for rotating said turn table, a brake device arranged to engage the periphery of said turn table to lock the same, said brake device comprising a brake block 19 pivotally mounted and having an operating handle 21, a mast mounted on said turn table, and a boom pivoted on said mast and having an operating cable.

5. The combination, with a frame, of a turn table pivoted thereon and having a peripheral groove, a chain fitting within said groove and attached to said turn table, means for applying power to said chain to rotate said turn table in either direction, said means consisting of an upright shaft centrally mounted in said frame and having an operating wheel at its upper end and a sprocket wheel near its lower end around which said chain passes, a mast mounted on said turn table and a boom pivoted on said mast and having an operating cable.

6. The combination, with a mast, of a boom pivoted thereon, sprocket wheels mounted within recesses in said boom, a sprocket chain connecting said wheels, a shaft whereon one of said wheels is mounted, an operating crank for said shaft and a boom extension slidably mounted on said boom and attached to said chain, whereby when said shaft is operated said boom extension will be moved back and forth on said boom, and a gathering fork carried by said extension.

7. The combination, with a mast, of a boom pivoted thereon, an operating cable, and a brace boom pivoted on said main boom and having a cable connection with said mast and with said main boom, substantially as described and a gathering fork connected with said main boom.

8. The combination, with a mast and main boom, of a boom extension, a gathering fork supported thereon, operating cables connected with said fork and with said boom extension, and a brace boom arranged between said mast and main boom, and also having an operating cable, and whereby said main boom and extension will be braced and supported when said fork is operating below the level of the pivot of said main boom.

9. The combination, with a mast, of a boom pivoted thereon, a sliding boom extension, means for operating said boom extension, back and forth on said boom, a frame mounted on said boom extension, an operating table connected therewith, a gathering fork pivoted in said frame, a shaft slidably mounted in slots in said frame, means operatively connecting said shaft with said fork, whereby when said shaft is moved in said slots, said fork will be opened or closed, and operating cables connected with said shaft, substantially as described.

10. The combination, with a mast, of a boom pivoted thereon, a sliding boom extension, and means for operating the same, operating cables connected with the outer end of said boom extension, and a gathering fork mounted on said boom extension, and means for opening and closing said fork said means comprising a sliding shaft having link connections with said fork and attached to said operating cables.

11. The combination, with a mast, of a main boom pivoted thereon, an operating cable, a brace or secondary boom pivoted at one end on said main boom near said mast and connected at its outer end with said mast and with said main boom and a gathering fork connected with said main boom.

12. The combination, with a mast, of a main boom pivoted thereon, a gathering fork a secondary or brace boom pivoted near the inner end of said main boom, the cable connecting the outer end of said secondary boom with said mast and whereby it may be raised or lowered and the cable connecting the top of said mast with the outer end of said brace boom and with the corresponding end of said main boom.

13. The combination, with a mast, of a boom pivoted thereon, a sliding boom extension and means for operating said extension, a frame mounted on said boom extension, an operating cable connected therewith, a gathering fork pivoted in said frame, opening and closing means for said fork mounted in said frame and operating cables connected with said opening and closing means.

14. The combination, with a mast, of a boom pivoted thereon, a boom extension, a gathering fork carried by said boom extension, means mounted on said boom extension for opening and closing said fork, and means within control of the attendant stationed near the mast for operating said opening and closing means, and cables connected with said boom and boom extension.

15. The combination, with a boom extension, of a frame secured thereon, a shaft vertically slidable in said frame, a gathering fork composed of pivoted sections supported in said frame, said sections being provided with upwardly extending arms and links connecting said arms with said shaft, and means within control of the operator of said boom extension for raising and lowering said shaft to close and open said fork.

16. The combination, with a boom extension, of a frame secured thereon and comprising parallel plates spaced apart and provided with vertical slots, a shaft arranged to slide vertically in said slots, a gathering fork pivotally supported between the lower ends of said plates, links connecting said shaft with said gathering fork and cables arranged to move said shaft up and down in said slots and open and close said fork.

In witness whereof, I have hereunto set my hand this 17th day of April 1907.

JOHN PETERSON.

Witnesses:
RICHARD PAUL,
J. B. ERA.